(12) United States Patent
Duran

(10) Patent No.: US 6,641,343 B1
(45) Date of Patent: Nov. 4, 2003

(54) FASTENER WITH MAGNETICALLY ACTUATED POSITIVE LOCK PLUG INSERT

(75) Inventor: John A. Duran, Glendora, CA (US)

(73) Assignee: Avibank Mfg., Inc., North Hollywood, CA (US)

(*) Notice: Subject to any disclaimer, the term of this patent is extended or adjusted under 35 U.S.C. 154(b) by 0 days.

(21) Appl. No.: 10/328,608

(22) Filed: Dec. 23, 2002

(51) Int. Cl.⁷ ................................................ F16B 37/14
(52) U.S. Cl. .................... 411/372.6; 411/348; 411/373; 411/431; 411/910
(58) Field of Search ............................. 411/348, 372.5, 411/372.6, 373, 431, 910; 70/225, 229, 230, 231, 232

(56) References Cited

U.S. PATENT DOCUMENTS

| | | | | |
|---|---|---|---|---|
| 2,627,778 A | * | 2/1953 | Hodell | 411/372.6 |
| 3,782,146 A | * | 1/1974 | Franke | 70/232 |
| 4,822,227 A | | 4/1989 | Duran | |
| 5,340,255 A | * | 8/1994 | Duran | 411/348 X |
| 5,479,799 A | * | 1/1996 | Kilman et al. | 70/231 |
| 5,676,511 A | * | 10/1997 | Meylan | 411/372.6 |
| 6,302,630 B1 | * | 10/2001 | Grant | 411/372.6 |

* cited by examiner

*Primary Examiner*—Neill Wilson
(74) *Attorney, Agent, or Firm*—Louis J. Bovasso; Greenberg Traurig

(57) ABSTRACT

A fastener having an enlarged head and a threaded portion with an interior cavity. A plug mounted in the cavity configured similarly thereto having an enlarged head generally the same outer diameter as the enlarged end of the fastener and abutting against the same closing off the opening leading into the cavity. The plug is releasably locked in the cavity and released by magnetic action when the releasable lock is released.

19 Claims, 6 Drawing Sheets

FASTENER WITH MAGNETICALLY ACTUATED POSITIVE LOCK PLUG INSERT

BACKGROUND OF THE INVENTION

1. Field of the Invention

The invention relates to aircraft fasteners; and, more particularly, to a fastener having a magnetically actuated positive lock plug insert in its head eliminating any cavities or holes in the head while providing a positive lock therein.

2. Related Art

Various types of aircraft fasteners are known in the art. In my U.S. Pat. No. 4,822,227, commonly assigned, I disclosed fastener assembly for joining a panel to a sub-panel of an aircraft or the like comprising a receptacle assembly having a threaded stud secured to the undersurface of the sub-panel. The assembly includes a bolt having an enlarged head at one end and a nose at the other end. The panel has a countersunk opening aligned with an opening in the sub-panel. The bolt is threaded for threaded engagement to the stud. The head of the bolt has a countersunk opening configured to a tool for rotating the same. This opening includes a releasable plug which is moved downwardly upon insertion of the tool to permit rotation thereof, then returns to a position flush with the exterior of the head of the bolt surrounding the opening.

A spring is used to bias the plug to a position wherein the upper surface of the plug is flush with the bolt head surrounding the countersunk opening in which the plug is disposed. This spring can wear or become clogged during use and may not return the plug to its fully flush position leaving a slight recess or cavity on the bolt head. In addition, overtorquing of the bolt by the user may distort the recess or cavity on the bolt head and create burrs on top of the bolt head. Such slight cavities or recesses or burrs may be detected by sophisticated radar if the bolt is installed on an aircraft panel.

There is a need for a fastener having a removable head plug in its bolt head that is positively locked therein and can be easily removed when it is desired to remove the bolt.

SUMMARY OF THE INVENTION

It is an object of this invention to provide an improved fastener having a plug closing off a hex socket or the like in the bolt head which is positively locked therein and removable using magnetic means.

It is a further object of this invention to provide a fastener having a removable head plug positively locked into a socket in the bolt head using ball locking means.

It is still further an object of this invention to carry out the foregoing object wherein the plug has a locking element of metallic material so it can be quickly and easily removed using a magnet.

These and other objects are preferably accomplished by providing a fastener having a removable head plug so that no cavities are visible or detectable in the fastener head.

These and other objects are preferably accomplished by providing a fastener including a bolt having a plug positively locked into the bolt head and any cavities in the bolt head are eliminated. The plug cannot come out during high vibrations. The plug may have an internal locking element of a metallic material or include a magnetic material in said element so that magnetic means can be used to remove the plug to replace the fasteners.

DETAILED DESCRIPTION OF THE PREFERRED EMBODIMENTS

Figure 1:
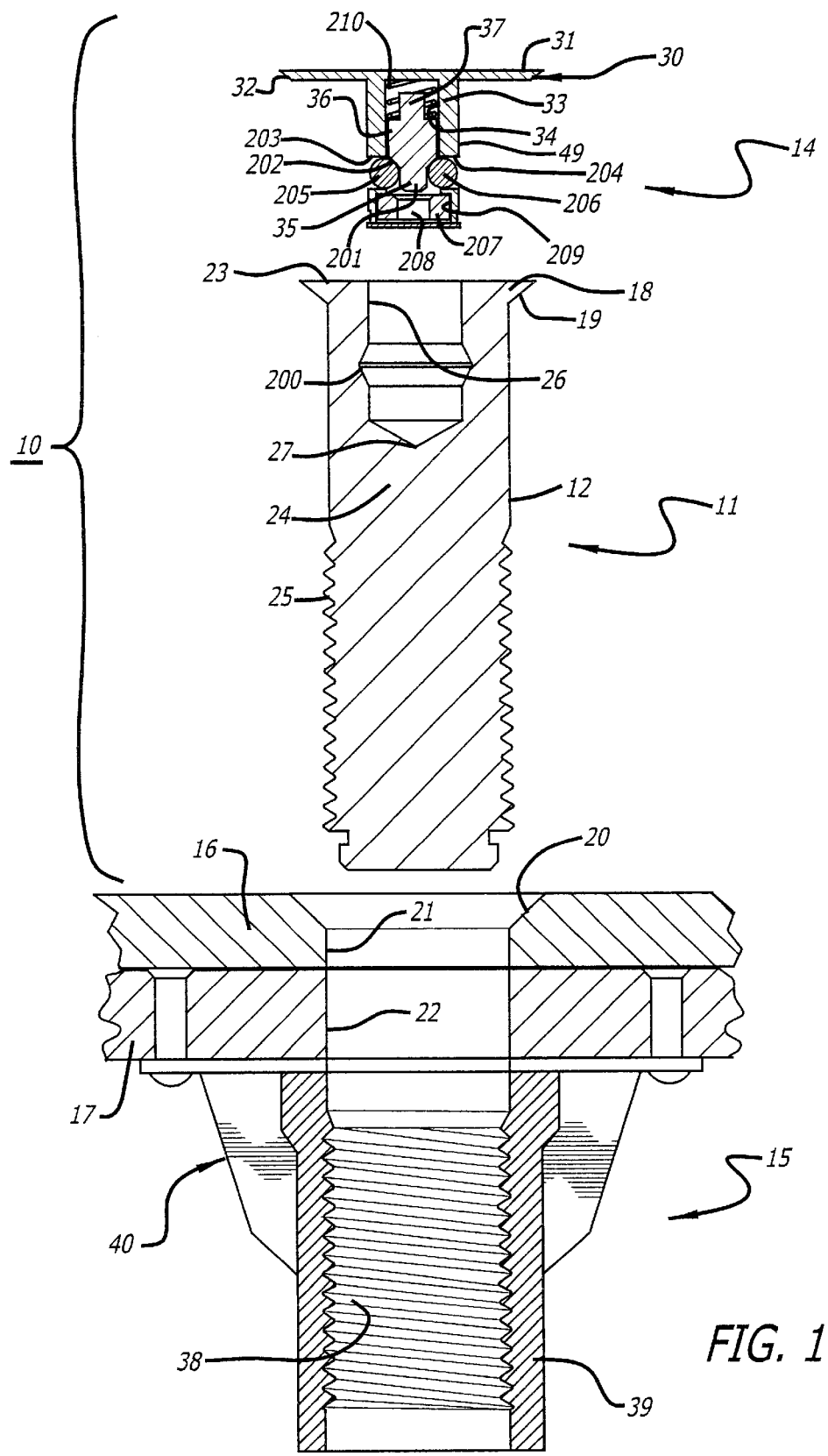
FIG. 1 is a exploded sectional view of a fastener assembly in accordance with the teachings of the invention.

Referring now to FIG. 1 of the drawing, a fastener assembly 10 is shown comprising a fastener 11, the fastener 11 having a main body portion 12, a threaded lower portion 25 and a head plug 14. A receptacle assembly 15 is shown associated with fastener 11 mounted to a pair of abutting panels 16, 17 as is well known in the art and will be discussed further hereinbelow.

Main body portion 12 includes an enlarged head 18 at one end having an undercut area 19 adapted to conform to the undercut area 20 on panel 16 leading into the aligned throughbores 21, 22 through panels 16, 17, respectively. Head 18 has a flush outer surface 23 and an integral generally cylindrical shaft 24 terminating in threaded portion 25.

Main body portion 12 also has an inner cavity 26 extending from surface 23 preferably downwardly to a point 27 above threaded portion 25. Of course, depending on the application, point 27 could extend further downwardly adjacent threaded portion 25. An annular groove 200 is provided in the side wall of cavity 26 for reasons to be discussed. Cavity 26 is hex shaped for receiving therein a suitable like configured tool for rotating the bolt 11 as is well known in the art. Of course, any suitable irregular configuration and like configured tool may be provided.

Figure 4:
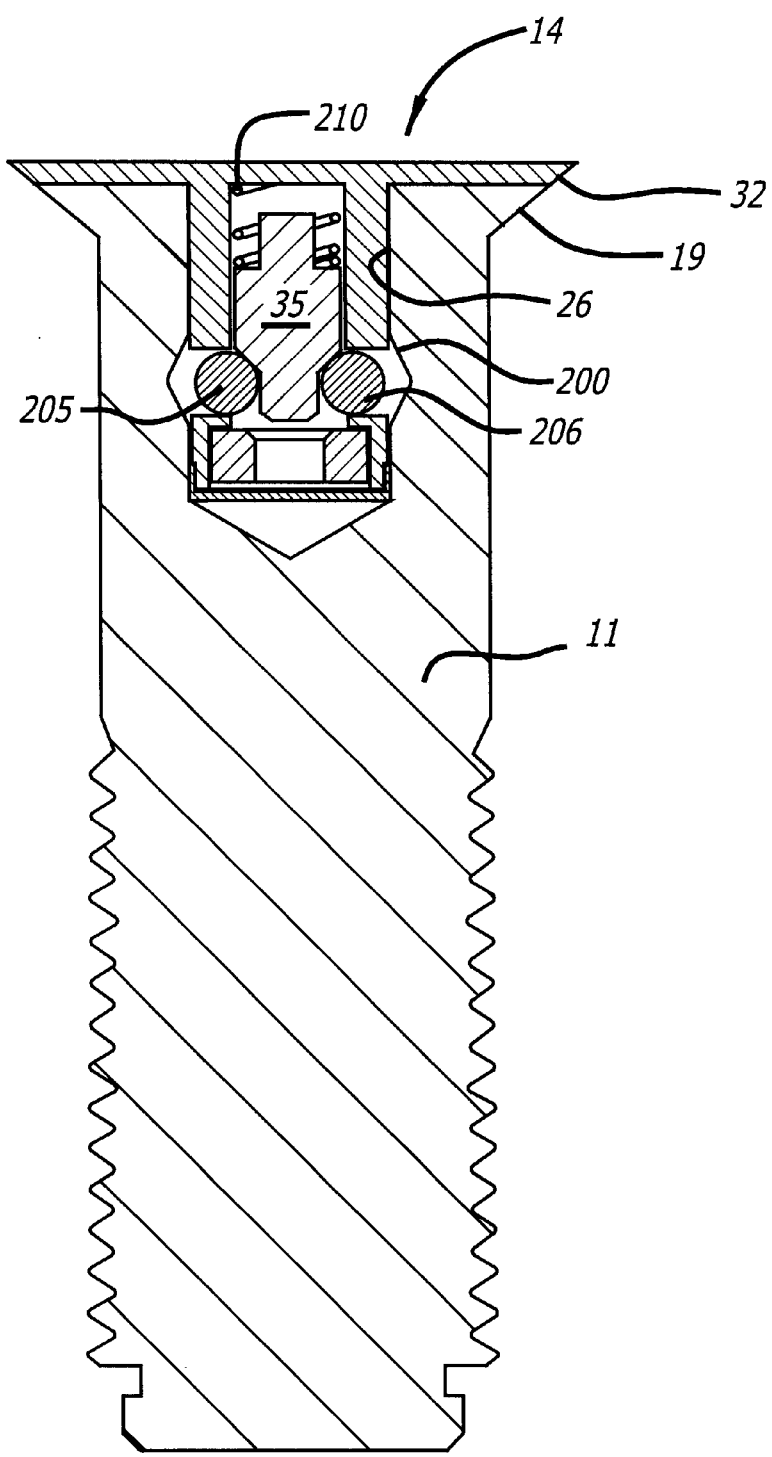
FIG. 4 is a view similar to FIG. 3 showing the plug in unlocked position.

Plug 14 includes an enlarged head portion 30 having an outer flush surface 31 generally of the same outer diameter as surface 23 of head portion 18. Enlarged head portion 30 is undercut, as at undercut portion 32, so that it aligns with the undercut 19 of main body portion 12 of bolt 11 as will be discussed further hereinbelow and as seen in FIG. 4.

Plug 14 also includes a generally cylindrical portion 33 having an outer hex shaped configuration 49 of a diameter generally related to the inner diameter of the cavity 26. Cylindrical portion 33 includes an inner hollow chamber 34 below head 30 with a ball detent actuator 35 reciprocally mounted therein.

Ball detent actuator 35 has a main body portion 36 of the same diameter as the cavity 34 with upper and lower extension portions 37, 201 of lesser diameter than body portion 36. Extension portion 201 tapers to main body portion 36, at tapered portion 202.

A pair of spaced openings 203, 204 are provided in body portion 33 with a pair of ball detents 205, 206 mounted in each opening 203, 204, respectively, and peened therein as is well known in the art. A spacer 207 is provided in cavity 34 below extension portion 201 having a central opening 208 therein into which extension portion 201 extends. Spacer 207 is disposed within an undercut area 209 of the lower end of body portion 33.

A coiled spring 210 surrounds extension portion 37 between the underside of head 30 and main body portion 36. Spring 210 normally biases actuator 35 to the FIG. 3 position, as will be discussed further hereinbelow.

Actuator 35 may be made of a magnetically attractive metallic material, or, alternatively, a magnet 211 (FIG. 5) may be embedded therein for reasons to be discussed.

The fastener 11 is adapted to engage the threaded portion 38 of barrel 39 of receptacle assembly 15. Barrel 39 is secured to a cage 40 as is well known in the art.

Figure 2:
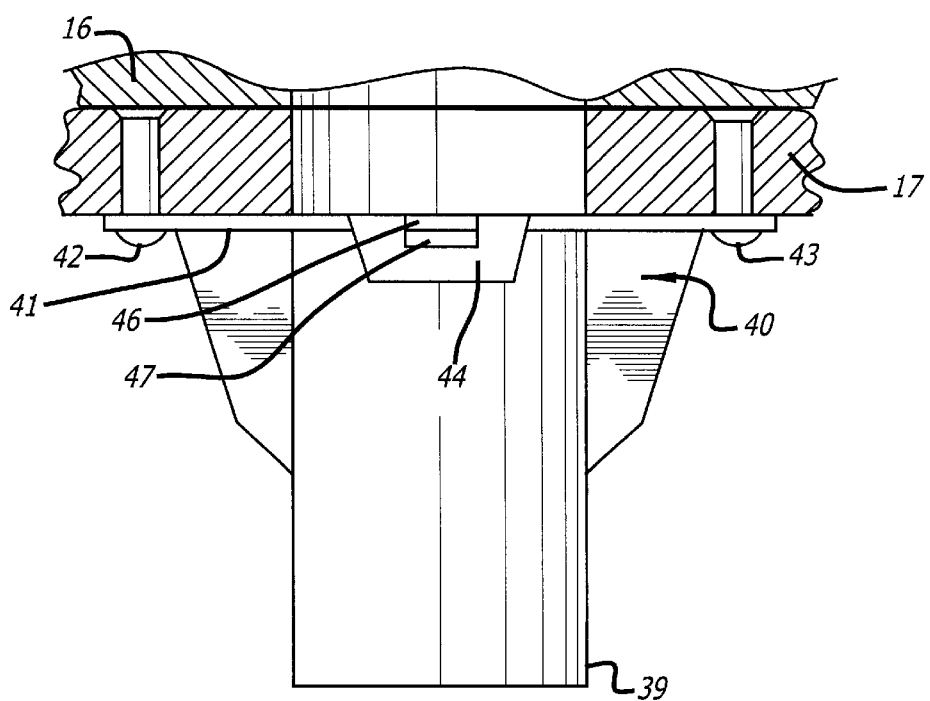
FIG. 2 is a detailed view of a portion of the assembly of FIG. 1.

Thus, as also seen in FIG. 2, cage 40 has a main flange portion 41 secured to the underside of panel 17 by suitable rivets 42, 43 and has a pair of downwardly extending spaced flanges 44 (only one visible in FIG. 2) each having a slot 46 therethrough (FIG. 2). Barrel 39 has a pair of spaced outwardly extending tabs or ears 47 which enter spaced slots 46.

In this manner, barrel 39 is secured to the panel 17 and the threaded portion 25 of main body portion 12 can threadably engage and be threaded to threaded portion 38 of barrel 39.

Figure 3:
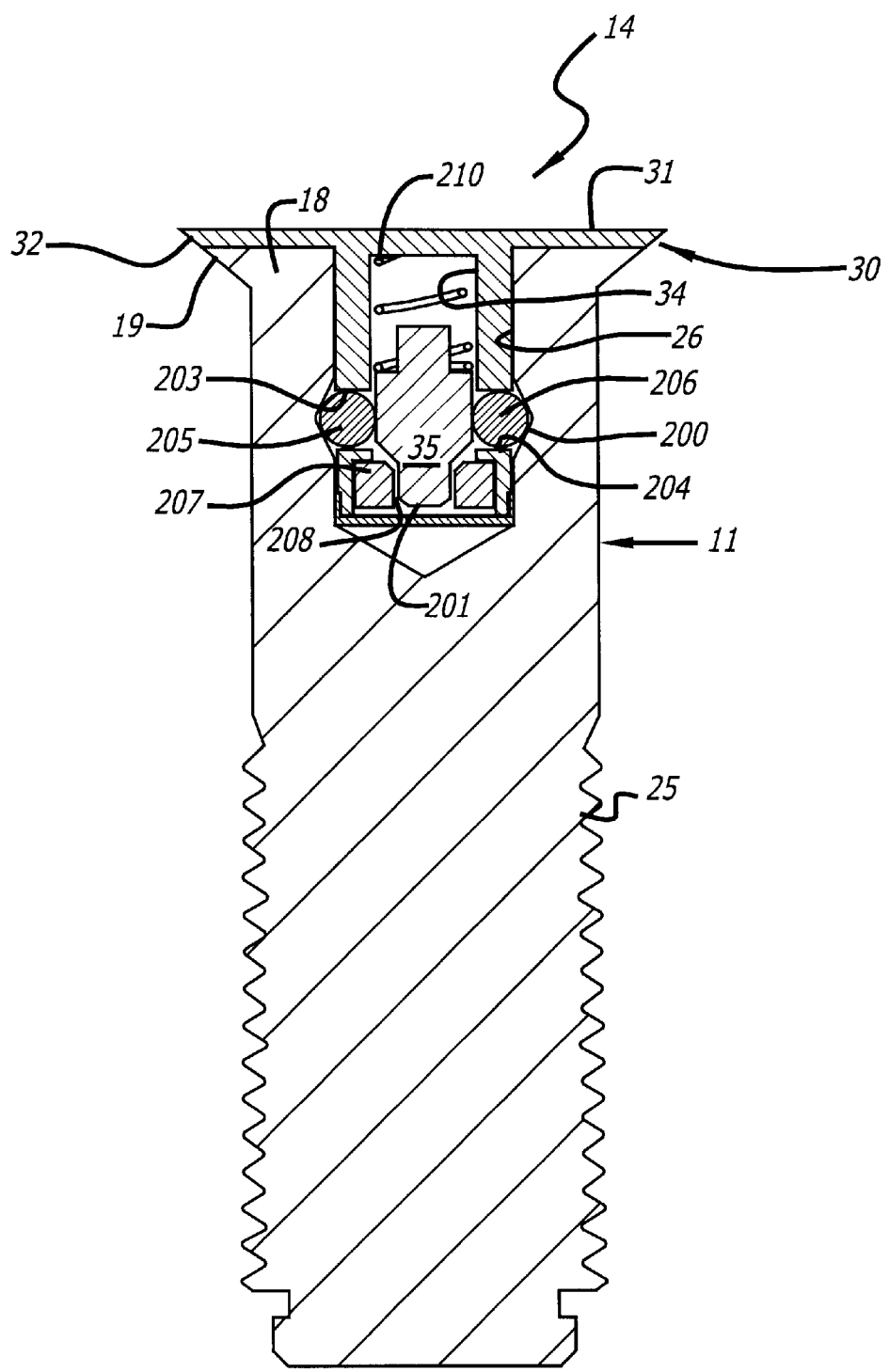
FIG. 3 is an elevational sectional view of the bolt alone of FIG. 1 illustrating the locking feature thereof.

The assembly of the parts of fastener 11 are shown in FIG. 3. Plug 14 is inserted into cavity 26, and actuator 35 is moved to a retracted position using a magnet, as previously discussed, with ball detents 205, 206 snapping outwardly into the groove 200 under the bias of spring 210 and release of the magnet. Detents 205, 206 snap into groove 200. Extension portion 201 enters the hole 208 in spacer 207.

It is noted that groove 200 assures that the plug 14 is properly positioned in the cavity 26. The groove 200, as seen in FIG. 1, has tapered side walls into which the ball detents 205, 206 align themselves (see particularly FIG. 3). This groove 200 assists in centering the ball detents 205, 206 and thus plug 14 in the correct position in cavity 26 thereby minimizing or eliminating any axial movement of plug 14 in bolt 11.

The tapered undersurface 32 of head 30 aligns with the tapered undersurface 19 of head 18 of bolt 11. This enables the plug and bolt to snugly fit to the undercut area 20 in panel 16.

If it desired to remove plug 14 from bolt 11, it is necessary to move actuator 35 upwardly against the bias of spring 210, as shown in FIG. 4. A suitable magnet (not shown) can be used by positioning the same into contact with head 31 of plug 14 and magnetically attracting the metallic actuator 35 and pulling it upwardly unlocking ball detents 205, 206. Thus, ball detents 205, 206 are moved out of groove 200 to the position shown in FIG. 4. Plug 14 can now be removed from bolt 11. It can be appreciated that, when actuator 35 is released to return to its FIG. 3 position, the downward movement of actuator 35 allows tapered portion 202 to move against detents 205, 206 and force them outwardly as seen in FIG. 3 to the locked position.

Figure 5:
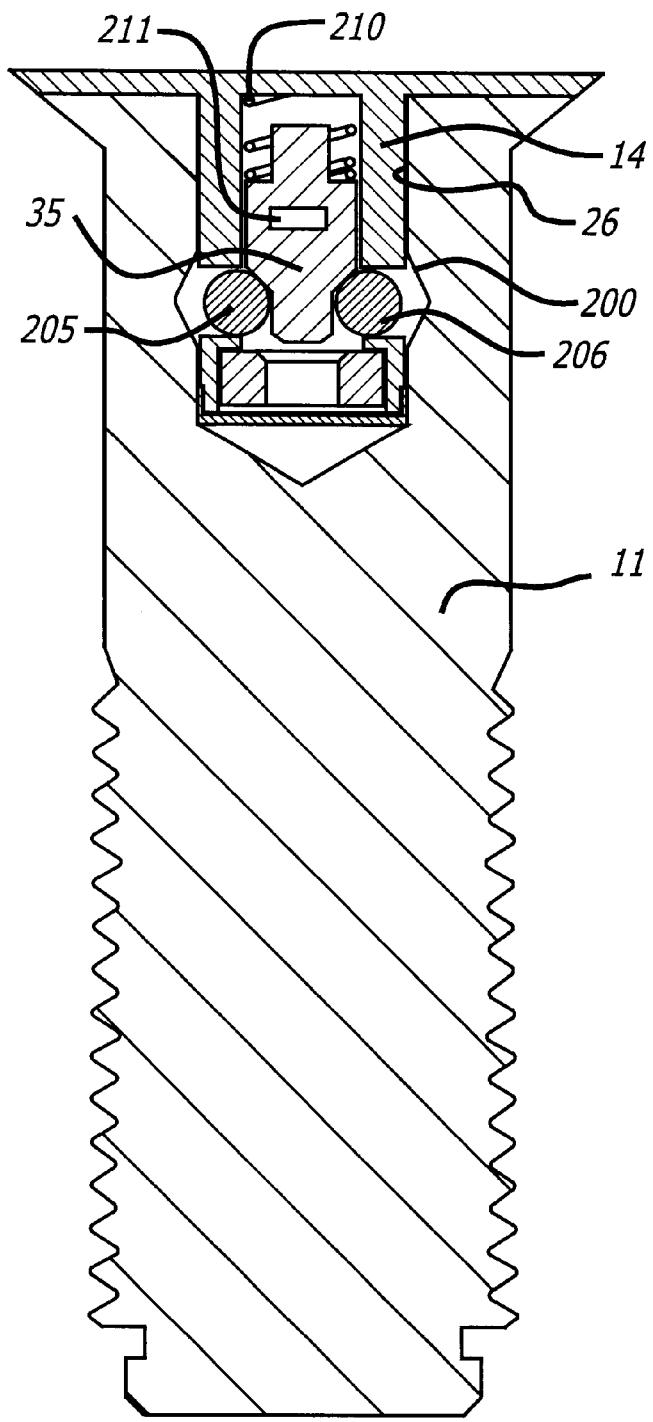
FIG. 5 is a view of a fastener alone similar to the fastener of FIG. 1 showing a modification thereof.

Although all or part of the body of the actuator 35 of FIGS. 1 to 4 may be of a magnetically attractive metallic material, as shown in FIG. 5, a magnet 211 may be embedded in the body of actuator 35 as seen in FIG. 5 wherein like numerals refer to like parts of FIG. 1. Any suitable metallic tool (not shown) can thus be used to attract magnet 211 and pull the actuator 35 upwardly to release the detents.

Although the plug and cavity are preferably hex-shaped, any suitable irregularly configured outer shape for the plug and inner configuration for the cavity may be used as long as the plug mates with the cavity.

Figure 6:
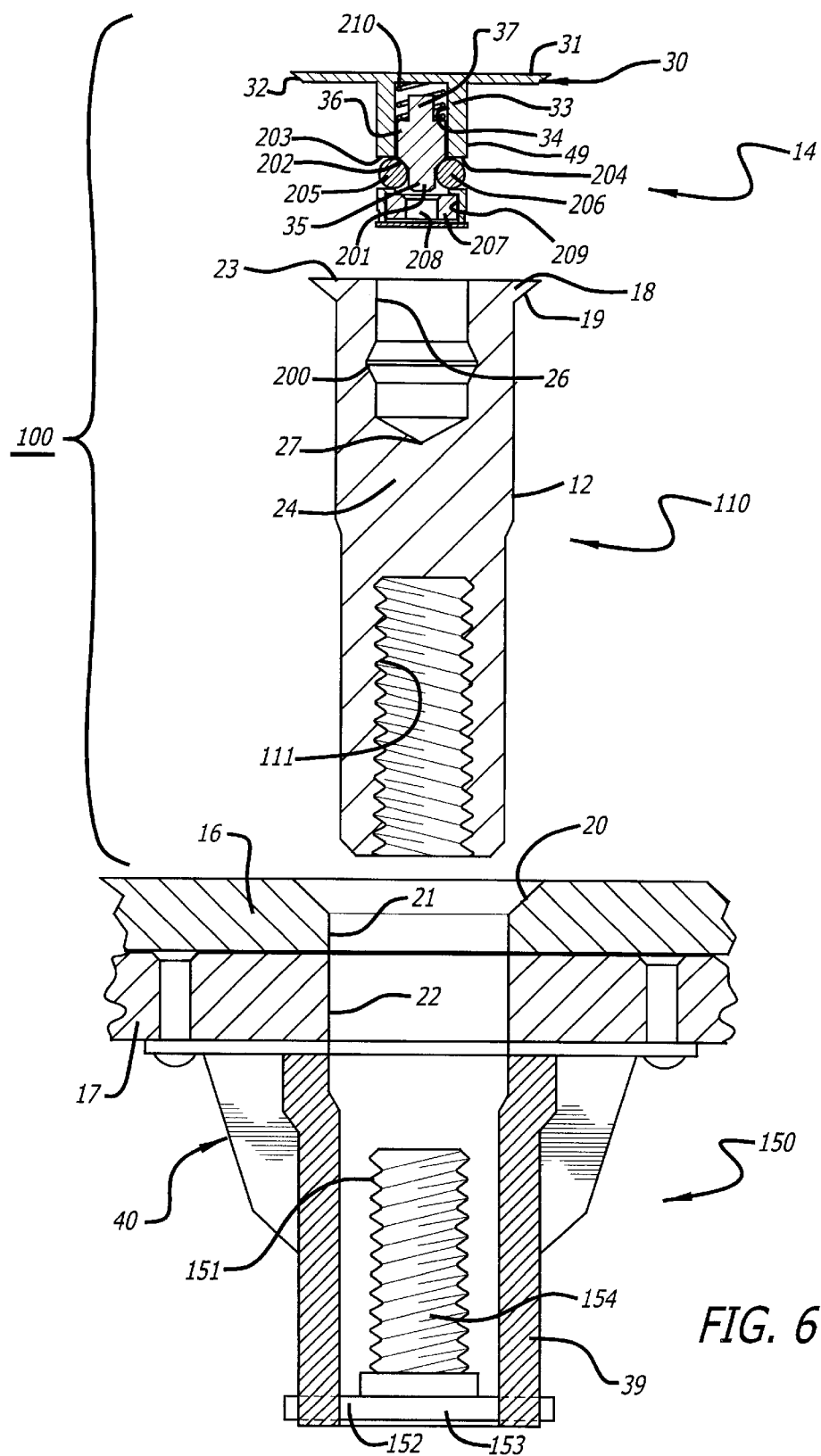
FIG. 6 is a view similar to FIG. 1 showing an internally threaded fastener and mating receptacle.

Although an externally threaded fastener is shown and described in FIGS. 1 to 5, the fastener may be internally threaded as shown in FIG. 6 wherein like numerals refer to like parts of the fastener and receptacle shown and described in FIGS. 1 to 5. Thus, as seen in FIG. 6, fastener assembly 100 is shown having a fastener 110 for threadable assembly to receptacle assembly 150. Instead of an external threaded lower portion 25, fastener 110 has an internally threaded cavity 111 adapted to matingly receive therein a threaded shaft 151 of a stud 154 of receptacle assembly 150. Receptacle assembly 150 may be crimped at crimp 152 about the head 153 of stud 154. In this manner, the plug and locking means of the invention can be used with either an external or internal threaded fastener.

While the specification describes particular embodiments of the present invention, those of ordinary skill can devise variations of the present invention without departing from the inventive concept.

I claim:

1. A fastener assembly comprising:
   a fastener having a main body portion with an upper end terminating in an enlarged head, a threaded lower end, an outer wall and an irregularly configured inner cavity at the upper end;
   a removable plug having an upper end and a lower end with an enlarged head at its upper end, said plug being removably mounted in said cavity, said removable plug and said cavity having locking means associated therewith for locking said plug in said cavity;
   releasable locking means associated with said plug for releasing said locking means permitting removal of said plug out of said cavity, said plug enlarged head being flush with said fastener enlarged end when locked in said cavity, said cavity including an inner peripheral wall and said plug including a main body portion configured similarly to said cavity, said locking means including an annular groove extending about said wall, said locking means further including movable detent means mounted in said plug movable from a first position into said groove locking said plus in said cavity to a second position out of said groove permitting removal of said plug out of said cavity; and
   said releasable locking means including a spring biased detent actuator reciprocally mounted in a chamber in the main body portion of said plug, said actuator being normally biased downwardly to a position forcing said detents into said groove.

2. The assembly of claim 1 wherein said actuator includes a movable member reciprocally mounted in said cavity, said movable member having a main body portion of an outer diameter slightly less than the internal diameter of said cavity, a first reduced section portion integral with said actuator main body portion extending upwardly therefrom of a less outer diameter than the outer diameter of said main body portion of said actuator, and said spring bias being provided by a coiled spring surrounding said first reduced section portion.

3. The assembly of claim 2 wherein said actuator further includes a second reduced section portion integral with said actuator main body portion and extending downwardly therefrom away from said first reduced section portion, said second reduced section portion tapering downwardly and way from said actuator main body portion forming a tapered portion to a detent engaging portion thereof having an outer diameter less than the outer diameter of said actuator main body portion, said groove having an inner wall and said tapered portion moving against said detents forcing said detents into said groove when said actuator is moved downwardly with said detents being retained in said groove by engagement with the actuator main body portion and the inner wall of said groove, said detents moving out of said groove and abutting against said second reduced section portion when said actuator is moved upwardly.

4. The assembly of claim 3 wherein said detents are balls mounted in spaced openings in the main body portion of said plug.

5. The assembly of claim 4 wherein the walls of said plug surrounding the openings in which said balls are disposed are peened to prevent said balls from exiting out of said plug.

6. The assembly of claim 3 wherein said inner wall of said groove has a pair of tapered portions, one of said tapered portions extending downwardly toward said threaded lower end of said fastener and way from the inner peripheral wall of said cavity toward the outer wall of said main body portion of said fastener, the other of said tapered portions extending upwardly toward the enlarged head of said fastener and away from the inner peripheral wall of said cavity toward the outer wall of said main body portion of said fastener, wherein said detents enter said groove abutting against said pair of tapered portions of said groove.

7. The assembly of claim 1 wherein said plug second reduced section portion extends into a central opening in a spacer mounted in said chamber.

8. The assembly of claim 1 wherein the interior of said cavity is hex-shaped and said plug includes a main body portion configured similarly to the interior of said cavity.

9. The assembly of claim 1 wherein at least a portion of said plug is of metallic material attractible to a magnet.

10. The assembly of claim 1 wherein at least a portion of said plug is of magnetic material.

11. The assembly of claim 1 wherein said enlarged head portion of said fastener has an undercut portion on the outer periphery of the underside thereof and an upper generally flat portion, said cavity opening to the exterior of said flat portion, the enlarged portion of said plug having an undercut portion on the outer periphery of the underside thereof, said enlarged portion of said plug being generally flat on the upper surface thereof, said plug underside abutting against the flat surface of said fastener when locked in said cavity with the undercut portions of said plug and said fastener being aligned on the exteriors thereof.

12. The assembly of claim 11 including a pair of abutting upper and lower panels having aligned openings therein, said upper panel having an undercut area surrounding said opening therethrough configured to the abutting undercut areas of said plug and said fastener.

13. The assembly of claim 12 wherein said lower panel has a barrel fixed thereto having thread means aligned with said openings through said panels adapted to mate with the threaded interior portion of said fastener.

14. The assembly of claim 1 including a barrel fixed to at least one panel, said barrel having a threaded portion adapted to mate with the threaded interior portion of said fastener.

15. A fastener comprising:
   a main body portion having an upper end and a lower end, said upper end having an enlarged head portion with a flat upper surface and an outer wall, said lower end having thread means for threadable engagement to a mating threaded member;
   a cavity in said main body portion upper end having an inner hex-shaped wall and opening out of said enlarged head portion;
   a plug having an irregularly configured outer configuration mounted in said cavity having an enlarged head portion with an upper surface and a lower surface said upper surface being generally flat and said lower surface abutting against the flat upper surface of the enlarged head portion of said fastener when said plug is mounted in said cavity; said cavity having an irregularly configured configuration mating with the configuration of said plug; and
   a plurality of spring biased spaced detents mounted in said plug, said detents disposed in a groove in the inner wall of said cavity locking said plug in said cavity.

16. The fastener of claim 15 wherein said plug includes a movable member reciprocal in a chamber within said plug, said member being of a magnetically attractive material whereby moving said member against its spring bias moves said detents out of said groove.

17. The fastener of claim 15 wherein said member is of a metallic magnetically attractive material.

18. The fastener of claim 15 wherein said member includes a magnetic material imbedded therein.

19. The fastener of claim 15 wherein said inner wall of said groove has a pair of tapered portions, one of said tapered portions extending downwardly toward said thread means of said fastener and away from the inner peripheral wall of said cavity toward the outer wall of said main body portion of said fastener, the other of said tapered portions extending upwardly toward the enlarged head portion of said fastener and away from the inner peripheral wall of said cavity toward the outer wall of said main body portion of said fastener, wherein said detents enter said groove abutting against said pair of tapered portions of said groove.

\* \* \* \* \*